US012567781B2

(12) United States Patent (10) Patent No.: US 12,567,781 B2
Cooling et al. (45) Date of Patent: Mar. 3, 2026

(54) PERMANENT MOTOR GENERATOR BAND BRAKES

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 502 days.

(21) Appl. No.: 18/105,499

(22) Filed: Feb. 3, 2023

(65) Prior Publication Data

US 2024/0266913 A1 Aug. 8, 2024

(51) Int. Cl.
*H02K 7/102* (2006.01)
*F02C 7/36* (2006.01)
*H02K 7/18* (2006.01)

(52) U.S. Cl.
CPC ............... *H02K 7/102* (2013.01); *F02C 7/36* (2013.01); *H02K 7/1823* (2013.01); *F05D 2240/60* (2013.01)

(58) Field of Classification Search
CPC .......... F16D 49/00–12; F16D 9/00–10; H02K 7/102–1028; H02K 7/18–1892; F02C 7/36; F05D 2240/60–63
See application file for complete search history.

(56) References Cited

U.S. PATENT DOCUMENTS

| | | | | |
|---|---|---|---|---|
| 3,386,536 A | * | 6/1968 | Davidson | ................ F16D 49/16 |
| | | | | 188/174 |
| 4,456,100 A | * | 6/1984 | Manaki | .................... F16D 65/04 |
| | | | | 188/77 R |
| 11,245,350 B2 | | 2/2022 | Adam et al. | |
| 2007/0108003 A1 | * | 5/2007 | Drewe | .................... F16D 49/20 |
| | | | | 310/92 |
| 2015/0051528 A1 | | 2/2015 | Gilbert et al. | |
| 2018/0226908 A1 | * | 8/2018 | Masolov | ................... H02P 9/08 |

(Continued)

FOREIGN PATENT DOCUMENTS

| | | |
|---|---|---|
| CN | 103835885 A | 6/2014 |
| JP | S57-49927 U | 3/1982 |

(Continued)

OTHER PUBLICATIONS

European Search Report dated Aug. 7, 2024 in connection with European Patent Application No. 24155384.1, 10 pages.

(Continued)

*Primary Examiner* — David R Morris

(57) ABSTRACT

A system includes a permanent magnet generator (PMG) with a generator shaft defining a longitudinal axis. A brake system includes a brake shaft with a first end operatively connected to the generator shaft for selectively rotating with the generator shaft or braking to slow the generator shaft. The brake system includes a band with a first position radially withdrawn from the brake shaft, and a second position radially pressed against the brake shaft for applying braking forces to the brake shaft and to the generator shaft. The brake system includes an actuator operatively connected to the band to actuate the band from the first position to the second position.

20 Claims, 2 Drawing Sheets

(56)　　　　　　References Cited

U.S. PATENT DOCUMENTS

2020/0096062 A1　3/2020　Smith
2020/0099322 A1　3/2020　Smith

FOREIGN PATENT DOCUMENTS

| JP | S57-98332 U | 6/1982 |
| JP | S60-186271 U | 12/1985 |
| JP | H09-25961 A | 1/1997 |
| WO | 2022/073551 A1 | 4/2022 |

OTHER PUBLICATIONS

Communication pursuant to Article 94(3) EPC dated Apr. 24, 2025 in connection with European Patent Application No. 24155384.1, 10 pages.

* cited by examiner

PERMANENT MOTOR GENERATOR BAND BRAKES

BACKGROUND

1. Field

The present disclosure relates to power generation, and more particularly to brakes for permanent magnet generators (PMGs) such as used with gas turbine engines to generate electrical power.

2. Description of Related Art

Wound field synchronous machine type generators have been used for power generation aboard aircraft with prime mover power input from the aircraft engine, e.g. gas turbine engines. Permanent magnet generators (PMGs) offer various operation advantages over synchronous field generators. However PMGs introduce a novel issue as synchronous machine type generators can simply be de-excited to stop feeding a fault in a very short time.

In a permanent magnet generator, any time the rotor is spinning, a voltage is being applied to the stator. If a short circuit fault occurs in the stator, the fault will continue to be active until the generator is at zero speed. Permanent magnet machines cannot be de-excited, they must be brought to zero speed to stop feeding the fault. This is particularly challenging because PMGs can spin two to five times faster than traditional would field synchronous machines.

The conventional techniques have been considered satisfactory for their intended purpose. However, there is an ever present need for improved systems and methods for PMG braking, e.g. in conjunction with aircraft engines. This disclosure provides a solution for this need.

SUMMARY

A system includes a permanent magnet generator (PMG) with a generator shaft defining a longitudinal axis. A brake system includes a brake shaft with a first end operatively connected to the generator shaft for selectively rotating with the generator shaft or braking to slow the generator shaft. A shear shaft is operatively connected to a second end of the brake shaft axially opposite the first end along the longitudinal axis. The shear shaft is configured for connection to a prime mover for rotation of the generator shaft. The shear shaft is configured to rotate together with the prime mover and with the brake shaft under normal conditions, and to disconnect the prime mover from the brake shaft if subjected to a predetermined torque. The brake system includes a band with a first position radially withdrawn from the brake shaft, and a second position radially pressed against the brake shaft for applying braking forces to the brake shaft and to the generator shaft. The brake system includes an actuator operatively connected to the band to actuate the band from the first position to the second position.

In the second position, the band can contact more than 50% of an outer circumference of the brake shaft. A surface of a substrate material of the band can be coated with a liner material with a higher friction coefficient than the substrate material. The liner material can be in contact with the brake shaft in the second position.

The PMG can be configured to be driven in a rotational direction, wherein a first end of the band contacts the brake shaft along a tangent in the second position, and wherein a second end of the band contacts the brake shaft along a tangent oblique to the first end of the band. The first and second ends of the band can be oriented so that contact with the brake shaft urges the band toward tightened engagement of the band toward the brake shaft due to the rotation direction of the PMG.

The actuator can include a lever arm. Each of the first and second ends of the band can be pinned to the lever arm so that the first end of the band is perpendicular to the lever arm, and so that the second end of the band is oblique relative to the lever arm. The second end of the band can extend through a space between the brake shaft and the lever arm. The brake system can include a housing with a cylinder defined in the housing. The actuator can include a piston slidingly engaged in the cylinder. A first end of the lever arm can be pinned to the piston, and a second end of the lever arm opposite the first end can be pinned to the housing so movement of the piston in the cylinder can drive the lever arm and the band between the first and second positions.

The actuator can include a servo valve. The cylinder can be in fluid communication with a control line of the servo valve. The servo valve can have a first state allowing a supply to flow from an inlet of the servo valve to an outlet of the servo valve to a return, and a second state connecting pressure from the inlet of the servo valve in fluid communication with the control line for pressurizing the piston to drive the lever arm and the band to the section position.

A biasing member can bias the piston toward the first position, wherein the biasing member is configured to maintain the piston in the first position with no pressure supplied from the servo valve. The piston can have a piston surface in fluid communication with the control line in the first position.

A gas turbine engine (GTE) can be operatively connected to the shear shaft to drive the PMG as a prime mover. A servo valve can be operatively connected to actuate the band between the first and second positions. The servo valve can be a hydraulic servo connected to an oil system that provides oil to the PMG and/or to the GTE. A generator control unit (GCU) can be operatively connected to the PMG for controlling electrical output of the PMG. The GCU can be operatively connected to a servo valve, which can be operatively connected to actuate the band based on commands from the GCU. A sensor can be operatively connected to the GCU to provide feedback for controlling the brake system. The sensor can include a speed sensor operatively connected to provide feedback to the GCU indicative of speed of the generator shaft. The sensor can include a voltage sensor operatively connected to a voltage output of the PMG to generate feedback to the GCU indicative of voltage output of the PMG.

The GCU can be configured to output servo current to the servo valve for control of braking of the generator shaft. The GCU can include machine readable instructions configured to cause the GCU to receive input indicative of an electrical fault condition for the PMG, and enter into a braking mode based on the input indicative of the electrical fault condition; and output a command to a servo valve for dynamic control of the brake system for dynamically applying braking to the generator shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
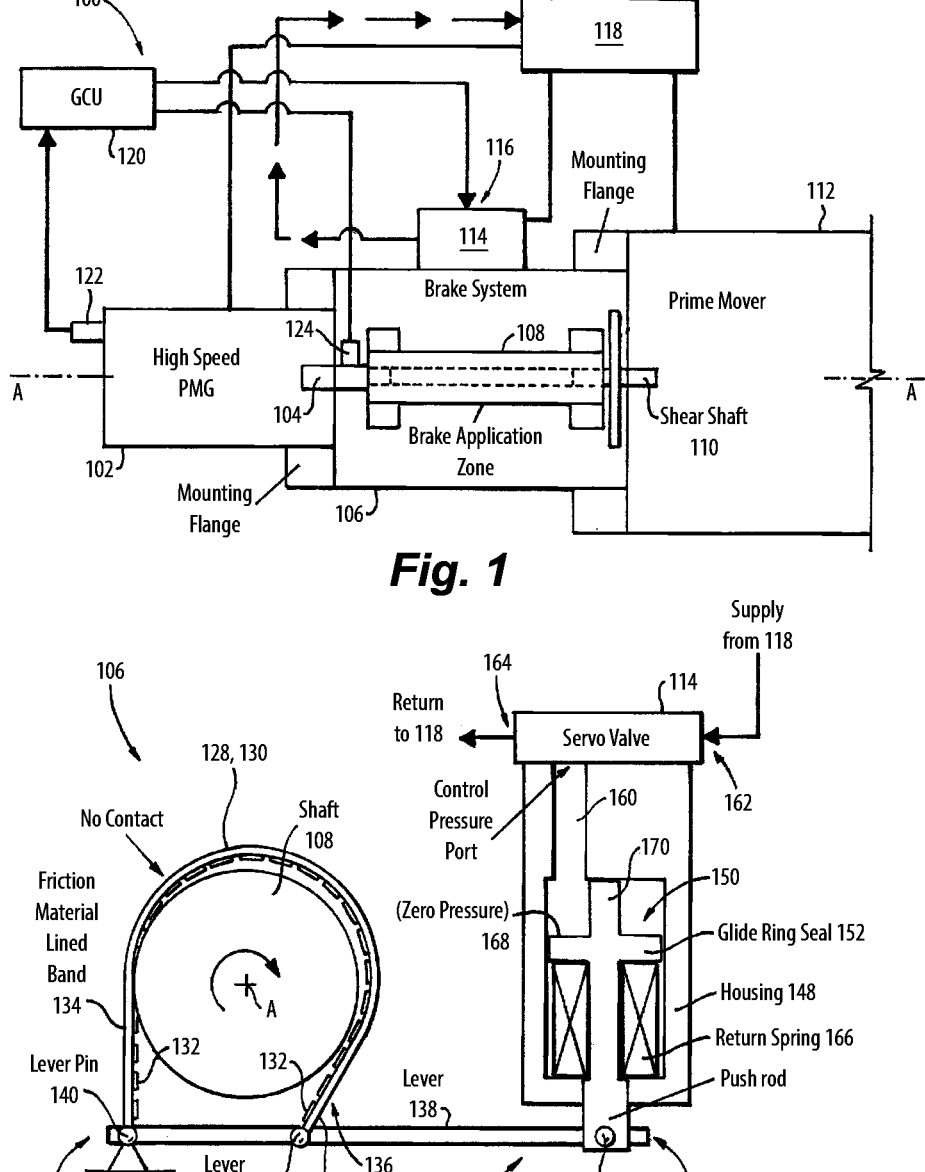
FIG. 1 is a schematic view of an embodiment of a system constructed in accordance with the present disclosure, showing the brake system between the permanent magnet generator (PMG) and the gas turbine engine (GTE)
FIG. 2 is a schematic view of the system of FIG. 1, showing the band of the brake system, with the actuator in the first position for normal operation of the PMG.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide braking protection for permanent magnet generator (PMG) systems such as used with aircraft engines and the like.

The system 100 includes a permanent magnet generator (PMG) 102, e.g. a high speed PMG for power generation on an aircraft, with a generator shaft 104 defining a longitudinal axis A. A brake system 106 includes a brake shaft 108 with a first end operatively connected to the generator shaft 104, e.g. with a spline, for selectively rotating with the generator shaft 104 or braking to slow the generator shaft 104, rupture the shear shaft 110 and bring the PMG 102 to zero speed.

A shear shaft 110 is operatively connected, e.g. with a spline or the like, to a second end of the brake shaft 108 axially opposite the first end along the longitudinal axis A. The shear shaft 110 is configured for connection to the prime mover 112 for rotation of the generator shaft, and is configured to rotate together with the prime mover and with the brake shaft 108 under normal conditions. The shear shaft 110 is configured to disconnect the prime mover 112 from the brake shaft 108 if subjected a predetermined torque, i.e. when the brake is applied as described below. The shear shaft can include a necking down, frangible structure, burstable structure, or the like, designed to break or burst at the predetermined torque.

With continued reference to FIG. 1, the actuator 116 of the brake system 100 includes a servo valve 114. The prime mover 112 is a gas turbine engine (GTE) that operatively connected to the shear shaft 110 to drive the PMG 102. The servo valve 114 is a hydraulic servo connected to an oil system 118 that provides oil to the PMG 102 and/or to the GTE for cooling and/or lubrication. The oil system 118 provides actuating oil to the servo valve 114 for use in actuating the braking system 100 as described below.

A generator control unit (GCU) 120 is operatively connected to the PMG 102 for controlling electrical output of the PMG 102. The GCU 120 is operatively connected to the servo valve 114, which is operatively connected to actuate the brake system 106 based on commands from the GCU 120. A sensor 122 is operatively connected to the GCU 120 to provide feedback for controlling the brake system 106.

The sensor 122 includes a voltage, current, and/or electrical fault sensor operatively connected to an electrical output of the PMG 102 to generate feedback to the GCU 120 indicative of electrical output of the PMG 102. It is also contemplated that in addition to or in lieu of the sensor 122, a sensor 124 can be a speed sensor operatively connected to provide feedback to the GCU 120 indicative of speed of the generator shaft 104, or the PMG 102 itself can be used as a speed sensor. The GCU 120 is configured to output servo current to the servo valve 114 for control of breaking of the generator shaft 104.

With continued reference to FIG. 1, the GCU 120 includes machine readable instructions, e.g. digital code, digital logic components, analog circuitry, and/or the like, configured to cause the GCU 120 to receive input, e.g. from the sensors 122, 124, indicative of an electrical fault condition for the PMG 102, and enter into a braking mode based on the input indicative of the fault condition; and output a command, e.g. servo current, to the servo valve 114 for dynamic control of the brake system 106 for dynamically applying braking to the generator shaft 104.

Figure 3:
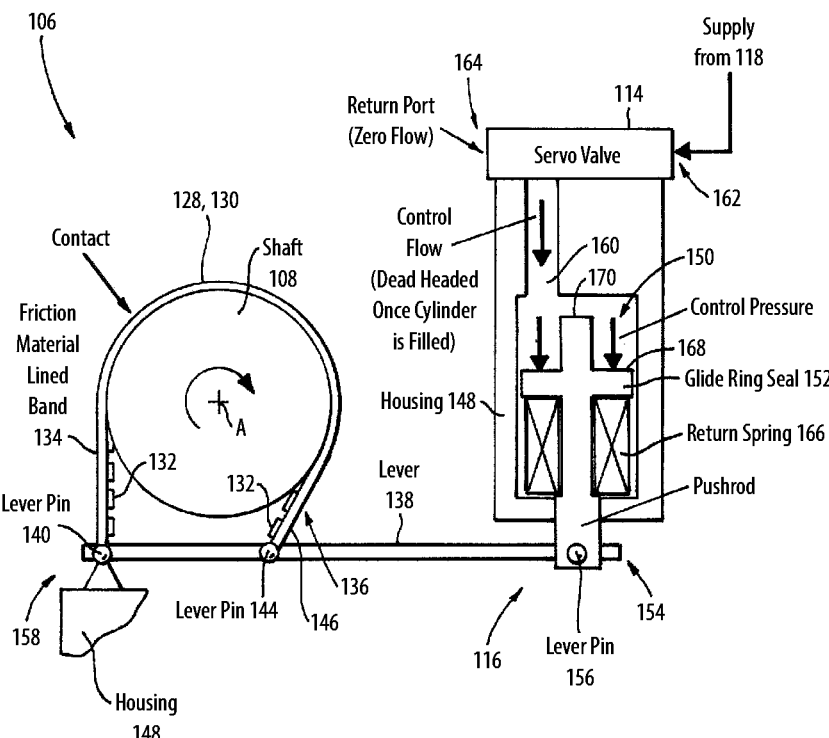
FIG. 3 is a schematic view of the system of FIG. 1, showing the band of the brake system, with the actuator in the second position for braking.

With reference now to FIGS. 2-3, the brake system 106 includes a band 128 with a first position, shown in FIG. 2, radially withdrawn and spaced apart from the brake shaft 108, and a second position, shown in FIG. 3, radially pressed against the brake shaft 108 for applying braking forces to the brake shaft 108 and to the generator shaft 104 of FIG. 1. The brake system 106 includes the actuator 116, which is operatively connected to the band 128 to actuate the band 128 from the first position, shown in FIG. 2, to the second position, shown in FIG. 3.

In the second position, shown in FIG. 3, the band 128 contacts more than 50% of an outer circumference of the brake shaft 108, i.e., the band 128 wraps more than half way around the circumference of the brake shaft 108. An inward facing surface of a substrate material 130 of the band 128 is coated with a liner material 132 with a higher friction coefficient than the substrate material 130. The liner material 132 is in contact with the brake shaft 108 in the second position as shown in FIG. 3.

The PMG 102, labeled in FIG. 1, is configured to be driven in a rotational direction about the longitudinal axis A, as indicated by the rotation arrow in FIG. 2. A first end 134 of the band 128 contacts the brake shaft 108 along a tangent in the second position shown in FIG. 3. The second end 136 of the band 128 contacts the brake shaft 108 along a tangent oblique to the first end 134 of the band 128. The first and second ends 134, 136 of the band 128 are oriented so that contact with the brake shaft 108 urges the band 128 toward tightened engagement of the band 128 toward the brake shaft 108 due to the rotation direction of the PMG 102, which is labeled in FIG. 1.

The actuator 116 includes a lever arm 138. Each of the first and second ends 134, 136 of the band 128 are pinned with respective pins 140, 142 to the lever arm 138 so that the first end 134 of the band 128 is perpendicular to the lever arm 138 in both the first and positions of FIGS. 2 and 3, and so that the second end 136 of the band 128 is oblique relative to the lever arm 138 in both the first and second positions of FIGS. 2 and 3. The second end 136 of the band 128 extends through a space 146 between the brake shaft 108 and the lever arm 138.

The brake system 106 includes a housing 148 with a cylinder 150 defined in the housing 148. The actuator 116 includes a piston 152 slidingly engaged in the cylinder 150, e.g. with a slide ring seal. A first end 154 of the lever arm 138 is pinned to a pushrod of the piston 152 with a pin 156.

A second end 158 of the lever arm 138 opposite the first end 154 is pinned to the housing 148, e.g. with pin 140, so movement of the piston 152 in the cylinder 150 can drive the lever arm 138 and the band 128 between the first and second positions shown in FIGS. 2 and 3. There is leverage on the second end 136 of the band 128 due to its pin being between the pins 140, 156 at the ends 158, 154 of the lever arm 138, giving the piston 152 some mechanical advantage in applying the braking forces as shown in FIG. 3.

With ongoing reference to FIGS. 2-3, the actuator 116 includes the servo valve 114 described above with reference to FIG. 1. The cylinder 150 is in fluid communication with a control line 160 of the servo valve 114. The servo valve 114 has a first state, shown in FIG. 2, allowing an oil supply (from the oil system 118 of FIG. 1) to flow from an inlet 162 of the servo valve to an outlet 164 of the servo valve 114 to a return of the oil system 118 of FIG. 1. The servo valve 114 has a second state, shown in FIG. 3, connecting pressure from the inlet 162 of the servo valve 114 in fluid communication with the control line 160 for pressurizing the piston 152 to drive the lever arm 138 and the band 128 to the section position shown in FIG. 3. The cylinder 150 and piston 152 dead head the pressure from the oil system 118 when the piston 152 reaches the second position shown in FIG. 3.

A biasing member 166, such as a spring, Belleville washer, compliant member, or the like, biases the piston 152 toward the first position of FIG. 2. The biasing member 166 is configured to maintain the piston 152 in the first position of FIG. 2 with no pressure supplied from the servo valve 114 to the control line 160. The piston 152 has a piston surface 168 in fluid communication with the control line 160 even in the first position shown in FIG. 2, and the standoff 170 of the piston 152 spaces the piston surface 168 from the housing 148 even in the first position shown in FIG. 2, which can help ensure the pressure from the control line 160 can act on the piston 152 when needed for braking.

Under normal operating conditions, the servo valve 114 can be in constant bypass mode as shown in FIG. 2. This results in zero control pressure in the control line 160. The biasing member 166 keeps the lever arm 138 pulled upwards, as oriented in FIG. 2, and thus the band 128 is not be engaged with the brake shaft 108 in the first position.

Under a main stator failure in the PMG 102 of FIG. 1, the servo valve 114 can be commanded, e.g. by a controller such as the GCU 120 in FIG. 1, to a zero bypass mode, where the servo outlet 164 is completely blocked off and flow is directed into the cylinder 150. This control pressure pushes the lever arm 138 downwards, as oriented in FIG. 3, which pulls the band 128 taught around the rotating brake shaft 108. The drag torque created by this ruptures the shear shaft 110, labeled in FIG. 1, and spins the rotor of the PMG 102, labeled in FIG. 1, down to zero speed expeditiously.

The methods and systems of the present disclosure, as described above and shown in the drawings, provide for braking protection for PMG systems such as used with aircraft engines and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
a permanent magnet generator (PMG) with a generator shaft defining a longitudinal axis;

a brake system, wherein the brake system includes a brake shaft with a first end operatively connected to the generator shaft for selectively rotating with the generator shaft or braking to slow the generator shaft; and
a shear shaft operatively connected to a second end of the brake shaft axially opposite the first end along the longitudinal axis, the shear shaft configured for connection to a prime mover for rotation of the generator shaft, the shear shaft also configured to rotate together with the prime mover and with the brake shaft under normal conditions and to disconnect the prime mover from the brake shaft if subjected to a predetermined torque differential between the prime mover and the brake shaft;
wherein the brake system includes a band with (i) a first position radially withdrawn from the brake shaft and (ii) a second position radially pressed against the brake shaft for applying braking forces to the brake shaft and to the generator shaft, wherein the brake system includes an actuator operatively connected to the band to actuate the band from the first position to the second position; and
wherein the shear shaft is configured to disconnect the prime mover from the brake shaft responsive to the braking forces applied to the brake shaft and the generator shaft by the band resulting in at least the predetermined torque differential.

2. The system as recited in claim 1, wherein, in the second position, the band contacts more than 50% of an outer circumference of the brake shaft.

3. The system as recited in claim 2, wherein the PMG is configured to be driven in a rotational direction, wherein a first end of the band contacts the brake shaft along a tangent in the second position, wherein a second end of the band contacts the brake shaft along a tangent oblique to the first end of the band, and wherein the first and second ends of the band are oriented so that contact with the brake shaft urges the band toward tightened engagement of the band toward the brake shaft due to the rotational direction of the PMG.

4. The system as recited in claim 3, wherein the actuator includes a lever arm, wherein each of the first and second ends of the band is pinned to the lever arm so that the first end of the band is perpendicular to the lever arm and so that the second end of the band is oblique relative to the lever arm, and wherein the second end of the band extends through a space between the brake shaft and the lever arm.

5. The system as recited in claim 4, wherein the brake system includes a housing with a cylinder defined in the housing, wherein the actuator includes a piston slidingly engaged in the cylinder, wherein a first end of the lever arm is pinned to the piston, and wherein a second end of the lever arm opposite the first end of the lever arm is pinned to the housing so movement of the piston in the cylinder drives the lever arm and the band between the first and second positions.

6. The system as recited in claim 5, wherein the actuator includes a servo valve, wherein the cylinder is in fluid communication with a control line of the servo valve, and wherein the servo valve has (i) a first state allowing a supply to flow from an inlet of the servo valve to an outlet of the servo valve to a return and (ii) a second state connecting pressure from the inlet of the servo valve in fluid communication with the control line for pressurizing the piston to drive the lever arm and the band to the second position.

7. The system as recited in claim 6, further comprising:
a biasing member configured to bias the piston toward the first position, wherein the biasing member is configured to maintain the piston in the first position with no pressure supplied from the servo valve.

8. The system as recited in claim 7, wherein the piston has a piston surface in fluid communication with the control line in the first position.

9. The system as recited in claim 1, further comprising:
a gas turbine engine (GTE) operatively connected to the shear shaft to drive the PMG as the prime mover.

10. The system as recited in claim 9, further comprising:
a servo valve operatively connected to actuate the band between the first and second positions, wherein the servo valve is a hydraulic servo connected to an oil system that is configured to provide oil to the PMG and/or to the GTE.

11. The system as recited in claim 1, further comprising:
a generator control unit (GCU) operatively connected to the PMG and configured to control electrical output of the PMG.

12. The system as recited in claim 11, wherein the GCU is operatively connected to a servo valve, which is operatively connected to actuate the band based on commands from the GCU.

13. The system as recited in claim 12, further comprising:
a sensor operatively connected to the GCU and configured to provide feedback for controlling the brake system.

14. The system as recited in claim 13, wherein the sensor includes a speed sensor operatively connected to provide feedback to the GCU indicative of speed of the generator shaft.

15. The system as recited in claim 13, wherein the sensor includes a voltage sensor operatively connected to a voltage output of the PMG to generate feedback to the GCU indicative of voltage output of the PMG.

16. The system as recited in claim 12, wherein the GCU is configured to output servo current to the servo valve for control of braking of the generator shaft.

17. The system as recited in claim 11, wherein the GCU includes machine readable instructions configured to cause the GCU to:
receive input indicative of an electrical fault condition for the PMG and enter into a braking mode based on the input indicative of the electrical fault condition; and
output a command to a servo valve for dynamic control of the brake system for dynamically applying braking to the generator shaft.

18. The system as recited in claim 1, wherein a surface of a substrate material of the band is coated with a liner material with a higher friction coefficient than the substrate material, wherein the liner material is in contact with the brake shaft in the second position.

19. A system comprising:
a permanent magnet generator (PMG) with a generator shaft defining a longitudinal axis;
a brake system, wherein the brake system includes a brake shaft with a first end operatively connected to the generator shaft for selectively rotating with the generator shaft or braking to slow the generator shaft; and
a shear shaft operatively connected to a second end of the brake shaft axially opposite the first end along the longitudinal axis, the shear shaft configured for connection to a prime mover for rotation of the generator shaft, the shear shaft also configured to rotate together with the prime mover and with the brake shaft under normal conditions and to disconnect the prime mover from the brake shaft if subjected to a predetermined torque differential between the prime mover and the brake shaft;
wherein the brake system includes a band with (i) a first position radially withdrawn from the brake shaft and (ii) a second position radially pressed against the brake shaft for applying braking forces to the brake shaft and to the generator shaft, wherein the brake system includes an actuator operatively connected to the band to actuate the band from the first position to the second position; and
wherein the band is configured so that contact with the brake shaft urges the band toward tightened engagement of the band toward the brake shaft due to a rotation direction of the PMG.

20. A system comprising:
a permanent magnet generator (PMG) with a generator shaft defining a longitudinal axis;
a brake system, wherein the brake system includes a brake shaft with a first end operatively connected to the generator shaft for selectively rotating with the generator shaft or braking to slow the generator shaft;
a shear shaft operatively connected to a second end of the brake shaft axially opposite the first end along the longitudinal axis, the shear shaft configured for connection to a prime mover for rotation of the generator shaft, the shear shaft also configured to rotate together with the prime mover and with the brake shaft under normal conditions and to disconnect the prime mover from the brake shaft if subjected to a predetermined torque differential between the prime mover and the brake shaft; and
a generator control unit (GCU) operatively connected to the PMG and configured to control electrical output of the PMG, the GCU comprising machine readable instructions configured to cause the GCU to:
receive input indicative of an electrical fault condition for the PMG and enter into a braking mode based on the input indicative of the electrical fault condition; and
output a command to a servo valve for dynamic control of the brake system for dynamically applying braking to the generator shaft;
wherein the brake system includes a band with (i) a first position radially withdrawn from the brake shaft and (ii) a second position radially pressed against the brake shaft for applying braking forces to the brake shaft and to the generator shaft, wherein the brake system includes an actuator operatively connected to the band to actuate the band from the first position to the second position; and
wherein the PMG is configured to be driven in a rotational direction, wherein a first end of the band contacts the brake shaft along a tangent in the second position, wherein a second end of the band contacts the brake shaft along a tangent oblique to the first end of the band, and wherein the first and second ends of the band are oriented so that contact with the brake shaft urges the band toward tightened engagement of the band toward the brake shaft due to the rotational direction of the PMG.

* * * * *